United States Patent [19]

Tokutomi et al.

[11] 4,384,770
[45] May 24, 1983

[54] FOCUS DETECTING DEVICE

[75] Inventors: Seijiro Tokutomi, Tokyo; Ryota Ogawa, Kawagoe; Michiro Ohishi; Kazuo Nakamura, both of Tokyo; Masao Jyojiki, Tsurugashima; Satoru Tachihara, Wako, all of Japan

[73] Assignee: Asahi Kogaku Kogyo Kabushiki Kaisha, Tokyo, Japan

[21] Appl. No.: 278,030

[22] Filed: Jun. 29, 1981

Related U.S. Application Data

[63] Continuation of Ser. No. 33,084, Apr. 25, 1979, abandoned.

[30] Foreign Application Priority Data

May 17, 1978 [JP] Japan .................. 53-58439

[51] Int. Cl.³ .............................................. G03B 3/00
[52] U.S. Cl. ........................................................ 354/25
[58] Field of Search ................. 354/25; 350/171, 296

[56] References Cited

U.S. PATENT DOCUMENTS

| | | | |
|---|---|---|---|
| 3,860,935 | 1/1975 | Stauffer | 354/25 |
| 4,080,531 | 3/1978 | Stauffer | 354/201 X |
| 4,158,131 | 6/1979 | Probst | 354/25 X |

FOREIGN PATENT DOCUMENTS 2634655  2/1978  Fed. Rep. of Germany ........ 354/25

OTHER PUBLICATIONS

Weber et al., *College Physics*, McGraw-Hill Book Co., NY, NY, 1959, pp. 475-478.

Primary Examiner—John Gonzales
Attorney, Agent, or Firm—Sughrue, Mion, Zinn, Macpeak and Seas

[57] ABSTRACT

A focus detecting device having two concave mirrors for reforming the image of an object which is formed between a lens and the focal plane of lens, and for dividing said image two same secondary images. Two light receiving element arrays are provided in the image forming planes of the secondary images. A signal processing circuit subjects the outputs of the light receiving element arrays to produce a signal indicating whether or not the lens is focussed on the object. By means of the two concave mirrors adapted to form said secondary images, the two secondary images are shifted in the opposite directions on the light receiving element arrays at the time of defocussing so that the difference between the outputs of the two light receiving element arrays is not zero. At the time of proper focus the two secondary images are located at equivalent positions on said light receiving element arrays so that the difference between the outputs of the two light receiving element arrays is zero. A signal processing circuit produces a signal indicating the establishment of the proper focus.

13 Claims, 18 Drawing Figures

FIG. 3a
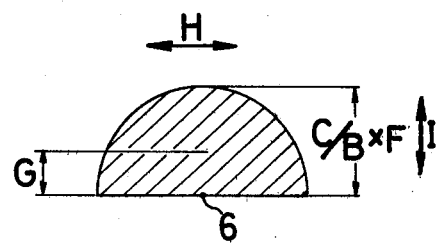
FIG. 3b
∠6
FIG. 3c
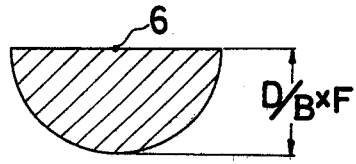
FIG. 4
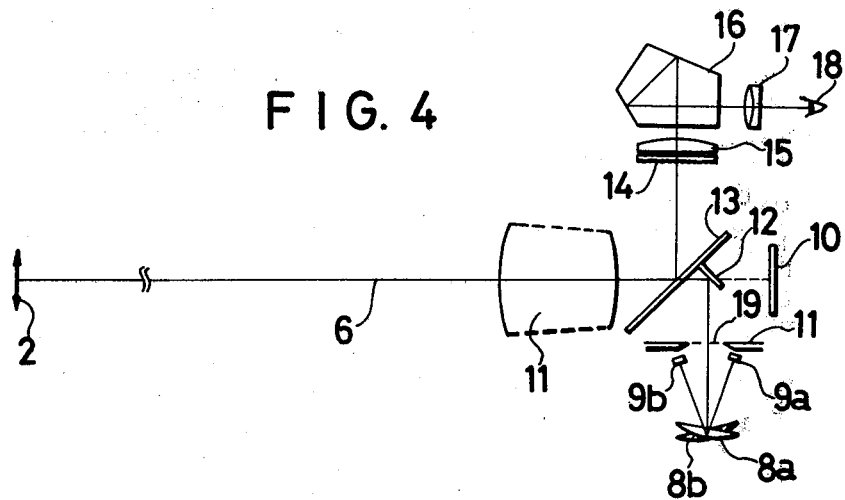

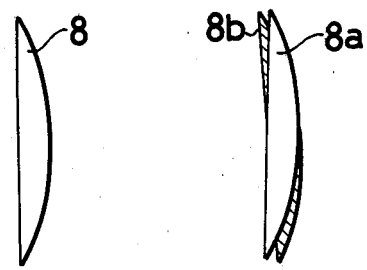
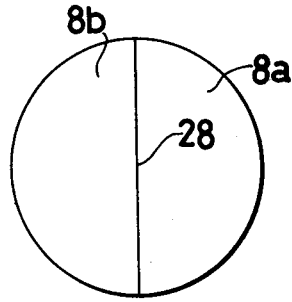
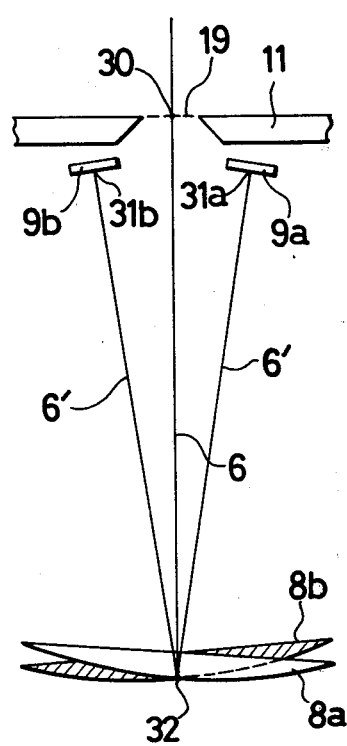
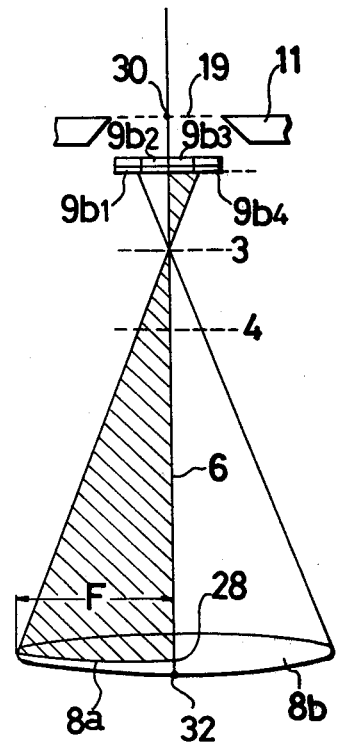

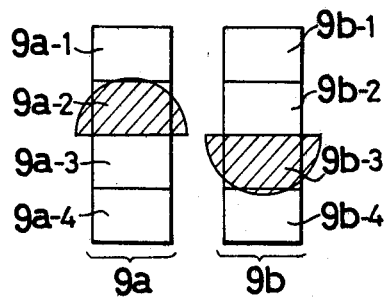
FIG. 8a
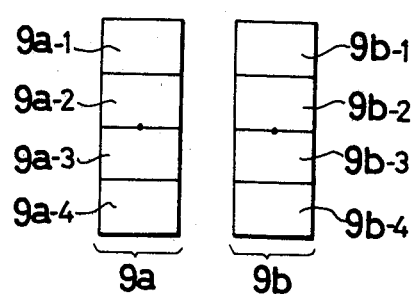
FIG. 8b
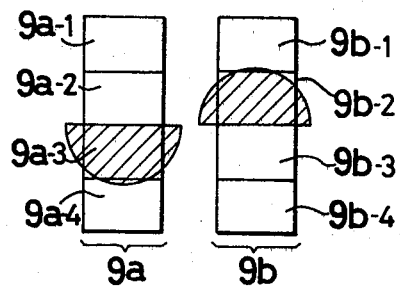
FIG. 8c
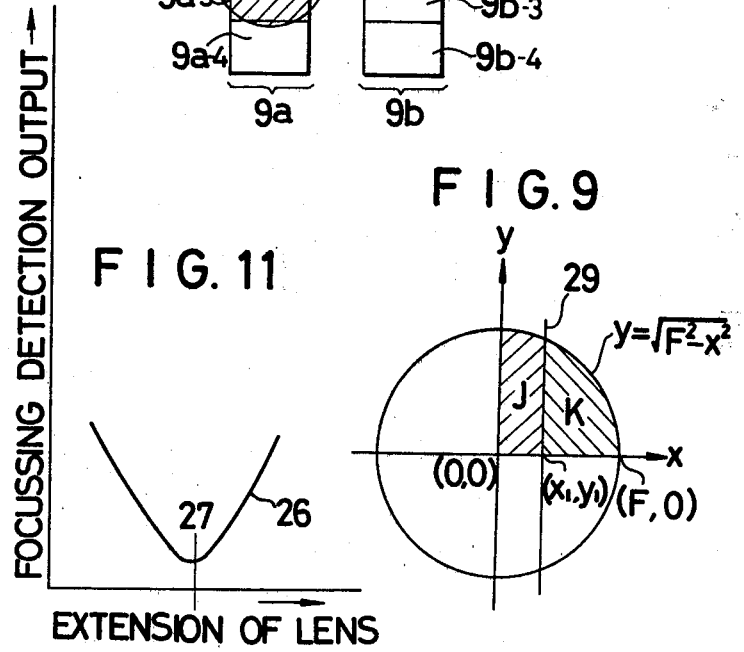
FIG. 11
FIG. 9

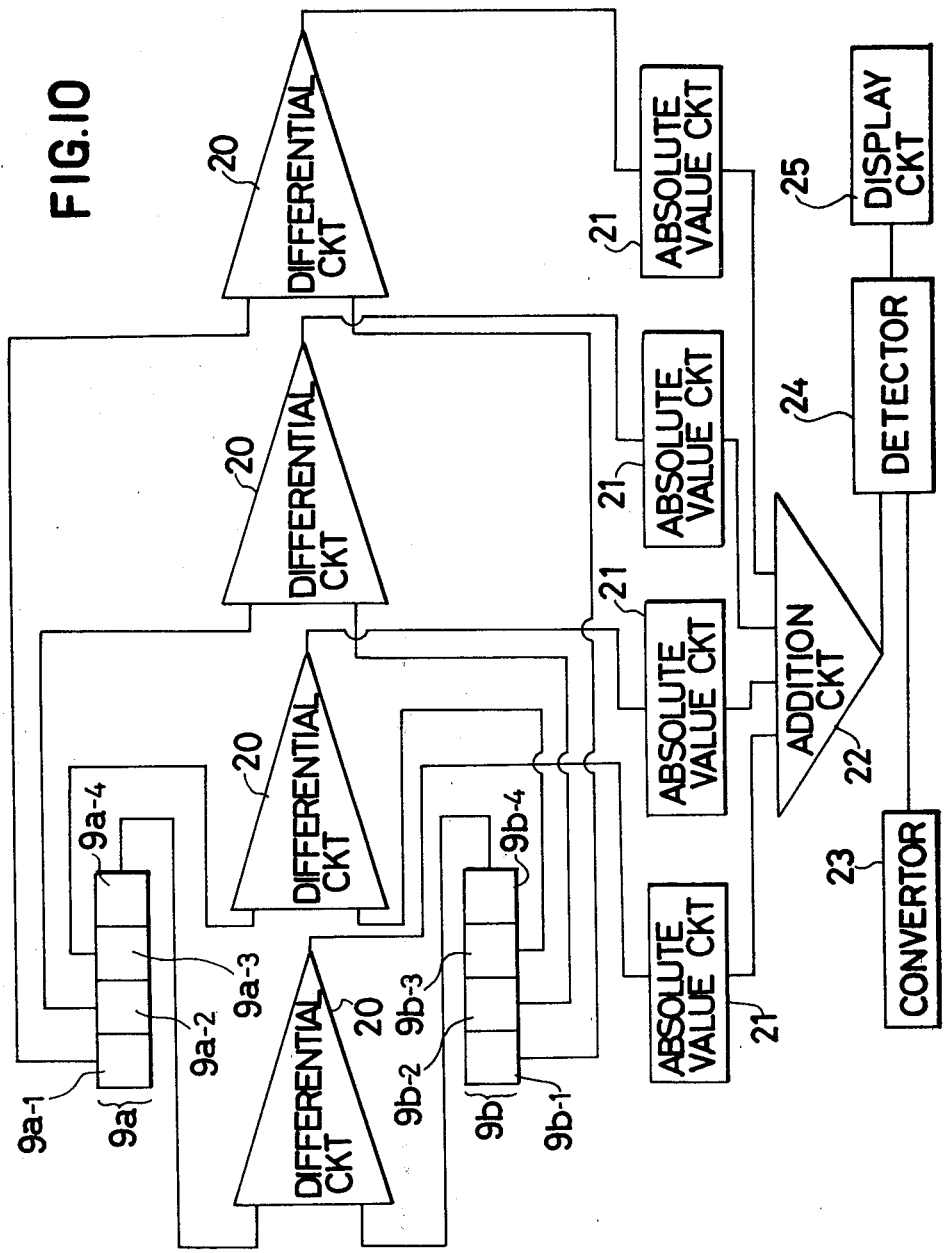

FOCUS DETECTING DEVICE

This is a continuation of application Ser. No. 33,084, filed Apr. 25, 1979, abandoned.

BACKGROUND OF THE INVENTION

This invention relates to focus detecting devices, and more particularly to a focus detecting device which is applicable to cameras and other optical instruments.

Focus detection methods have been proposed in the art, in which the focus is detected by utilizing the fact that the contrast, spatial frequency or light quantity of an object is changed according to the degree of focussing. In a first one of the conventional methods, a photoelectric element such as a CdS cell having a particular contrast sensing characteristic is utilized. In a second method, a photoelectric output signal obtained by mechanically vibrating or rotating an optical member is utilized. In a third method, similar to a range/view finder, two outputs of light detecting members disposed at different positions are utilized for detecting the focus.

However, the first method suffers from a serious drawback that it is difficult to detect the focus with high accuracy because it is difficult to manufacture photoelectric elements having the same light response characteristic. Also, the output variation rate of the photoelectric elements is low before and after the focussing is obtained in detecting the focus under conditions of low intensity of illumination. The second method is disadvantageous in that it is difficult to miniaturize the camera because it has mechanically movable components, and it consumes large amounts of electric power. The third method is also disadvantageous in that it is difficult to change the lens with that type of system.

SUMMARY OF THE INVENTION

Accordingly, an object of this invention is to provide an optical-focus detecting device which satisfies various conditions such as miniaturization of the optical system, maintenance of high accuracy, correct operation at low intensity of illumination, and operation with low electric power consumption.

It is another object of this invention to provide an optical focus detection system useable with interchangeable lenses.

If briefly stated, a principle of the invention is to detect the focus according to a dual image coincidence system. A feature of the invention resides in the use of two concave mirrors employed as means for dividing the image of an object into two parts. As a result, the construction of the system is simplified and the brightness of the image is increased.

Two concave ellipsoidal or spherical mirrors are employed for reforming the image of an object which is formed between a lens and the focal plane of the lens, and for dividing said image into two same secondary images. Two light receiving element arrays are provided in the image forming planes of the secondary images. A signal processing circuit subjects, the outputs of the light receiving element arrays to produce a signal indicating whether or not the lens is focussed on the object.

By means of the two concave mirrors adapted to form said secondary images, the two secondary images are shifted in the opposite directions on the light receiving element arrays at the time of defocussing so that the difference between the outputs of the two light receiving element arrays is not zero. At the time of proper focus the two secondary images are located at equivalent positions on the light receiving element arrays so that the difference between the outputs of said two light receiving element arrays is zero. A signal processing circuit produces a signal indicating the establishment of focussing.

BRIEF DESCRIPTION OF THE DRAWINGS

FIGS. 3(a)–(c) are sectional views of the bundle of rays: more specifically, FIG. 3(a) is a sectional view of the bundle of rays at a plane 4, FIG. 3(b) is a sectional view of the bundle of rays at an image forming plane, and FIG. 3(c) is a sectional view of the bundle of rays at a plane 5;

FIG. 4 is a schematic diagram showing one example of a single-lens reflex camera to which a focus detecting device according to this invention is applied;

FIGS. 5(a)–(c) are explanatory diagrams showing concave mirrors;

FIG. 6 is an enlarged diagram showing light receiving element arrays 9a and 9b and components related thereto;

FIG. 7 is a diagram as viewed from the right side of FIG. 6;

FIGS. 8(a)–(c) show various images of an object on the optical path obtained when the lens is focussed and unfocussed on the object;

FIG. 9 is a diagram for obtaining the center of the area of a half circle;

FIG. 10 is a block diagram showing a processing circuit;

FIG. 11 is a graphical representation with the extension of the lens plotted on the horizontal axis and focus detection outputs plotted on the vertical axis.

DESCRIPTION OF THE PREFERRED EMBODIMENT

One example of a focus detecting device according to this invention will now be described with reference to the accompanying drawings, in which like parts are designated by like numerals or characters.

Figure 1:
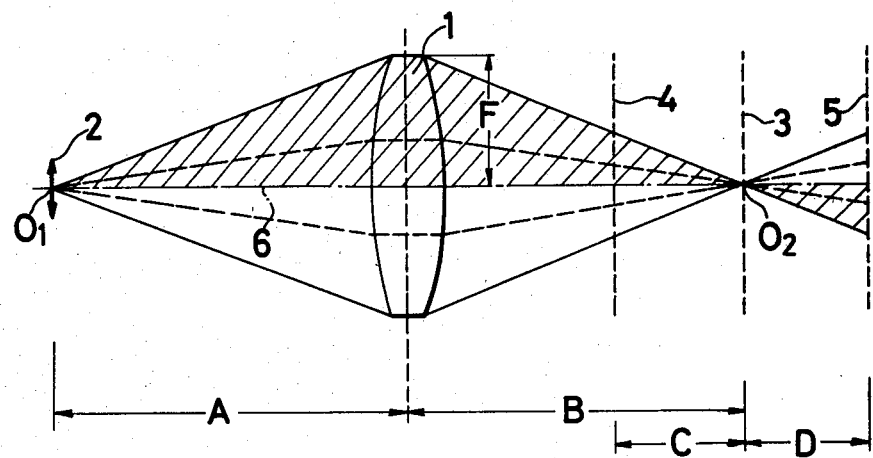
FIG. 1 is a schematic diagram of a description of a principle of the invention, showing the optical path of a bundle of rays from a portion of an object on the optical axis.

FIG. 1 is a diagram for a description of the focus detecting principle of the device according to the invention. A bundle of rays from an object 2 is applied to a lens 1 and the image of the object 2 is projected onto an image forming plane 3. The distance between the object 2 and the principal point of the lens is represented by line A and the distance between the principal point of the lens and the image forming plane, line B. Reference numeral 6 designates an optical axis. The optical rays from the point $O_1$ of the object on the optical axis pass through the entire surface of the lens 1 and converge at the point $O_2$ on the optical axis. For simplification in description, it is assumed that the rays are applied equally to one entire surface of the lens; that is, the quantities of light are equal over the entire surface of the lens.

Consider now two planes 4 and 5 which are located at the distances C and D from the image forming plane 3 as shown in FIG. 1, respectively. The plane 4 is on the left side of the image forming plane 3 and the plane 5 is on the right side. As indicated by the shadowed portion, the bundle of rays passing through the upper half of the lens is above the optical axis 6 on the left side of the image forming plane 3 and is below the optical axis on the right side of the same. The sections of the bundle of rays at the planes 3, 4 and 5 are as follows:

The section of the bundle of rays at the plane 4 is a half circle whose radius is (C/B)×F as shown in FIG. 3(a). The section of the bundle of rays at the plane 5 is a half circle whose radius is (D/B)×F as shown in FIG. 3(c), the half circle being below the optical axis 6. It is obvious that the bundle of rays forms a point at the plane 3 as shown in FIG. 3(b). The focus detecting principle of the invention can be explained from the movement of the bundle of rays in an unfocussed condition. The amount of movement of the center of the section of the bundle of rays is considered to be the amount of movement of the unfocussed image. For instance, if the bundle of rays is uniform, then the center of the half circle in FIG. 3(a), when the quantity of light thereof is taken into account, is equal to the center of the area.

Therefore, the center of the area of the half circle is about 0.4F·C/B above the optical axis. This can be shown by considering a half circle with a radius F drawn on a plane with the coordinates axes as shown in FIG. 9 in order to obtain the center of the area of the half circle. Let the coordinates of the center of the area be $(x_1, y_1)$. Then $y_1=0$ because the x coordinate axis is the symmetrical axis. For the same reason, the $x_1$ coordinate can be obtained from a perpendicular, $x=x_1$, which divides the quarter circle in the first quadrant of the x-y coordinate system into two regions J and K equal in area. It is apparent that the area of each of the regions is ¼ of the area of the half circle. This can be expressed by the following equation:

$$\int_0^{x_1} \sqrt{F^2 - x^2}\, dx = \int_{x_1}^{F} \sqrt{F^2 - x^2}\, dx = \pi F^2/8$$

Then, $x_1 = 0.40397 \ldots \times F$

Therefore, the center of the area of the bundle of rays is removed by about 0.4F·C/B from the optical axis 6. The image is moved vertically as viewed in the figure. This amount of movement is represented by the distance G in FIG. 3(a). Thus, G=0.4F·C/B.

The case where the optical system in FIG. 1 is applied to a camera will now be discussed. In this utility, it is assumed that the plane 3 is the film surface when the lens is focussed on the object. The plane 4 is the film surface when the lens is focussed on a point in rear of the object (hereinafter referred to as "rear defocussing" when applicable). Finally, the plane 5 is the film surface when the lens is focussed on a point in front of the object (hereinafter referred to as "front defocussing" when applicable). The image of the object on the optical axis is shifted G=0.4F·C/B above the optical axis in the case of the rear defocussing. It is shifted 0.4F·D/B below the optical axis in the case of the front defocussing. In this connection as shown in FIG. 1, the distance C is the amount of rear defocussing, and the distance D is the amount of front defocussing.

Now, consider the case where the upper half of the photographing lens is covered to allow a bundle of rays passing through the lower half of the lens to form an image. The image formed by the bundle of rays passing through the lower half of the lens from the object is below the optical axis at the plane 4. The amount of movement thereof is −G=−0.4F·C/B. The image is above the optical axis at the plane 5, and the amount of movement thereof is 0.4F·D/B. The direction of movement of the image is opposite to that of the image which is formed by the bundle of rays passing through the upper half of the lens. The centers of the images which are formed by the two bundles of rays passing respectively through the upper and lower halves of the lens are spaced from each other 0.8F·D/B in the case of front defocussing and 0.8F·C/B in the case of rear defocussing.

Figure 2:
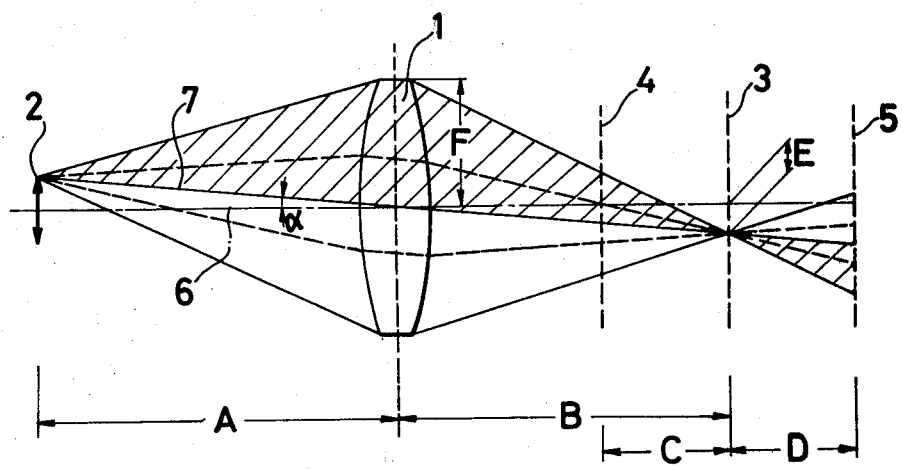
FIG. 2 is a schematic diagram of a description of the principle of the invention, showing the optical path of a bundle of rays from a portion of the object remote from the optical axis.

As shown in FIG. 2, a bundle of rays from a point on an object, which is spaced from the optical axis forms an image at a distance E from the optical axis and on an image plane 3. If the distance E is changed, all of the bundles of rays from all the points on the object can be investigated. However, the optical components perpendicular as viewed in FIG. 2 (or in the direction of the arrow H in FIG. 3) will be disregarded in the description of the movement because the movement of the image is vertical (or in the direction of the arrow I in FIG. 3).

The case where, similar to the above-described case, will now be described where the lower half of the lens is covered to allow a bundle of rays (shadowed in FIG. 2) passing through the upper half of the lens to form an image. In this case, the center of the quantity of light thereof is remote $0.4 \times F \times C/B - \tan \alpha\, (B-C)$ from the optical axis 6 at the plane 4, and $0.4 \times F \times D/B + \tan \alpha\, (B+D)$ from the optical axis 6 at the plane 5, where $\alpha$ is the angle formed by the main optical axis 7 and the optical axis 6. Furthermore, in the case of the image formed by the bundle of rays passing through the lower half of the lens, the center of the quantity of light thereof is remote $0.4 \times F \times C/B + \tan \alpha\, (B-C)$ from the optical axis at the plane 4, and $0.4 \times F \times D/B - \tan \alpha\, (B+D)$ from the optical axis at the plane 5. In the latter case, the direction of movement of the image is opposite to that of the image formed by the bundle of rays passing through the upper half of the lens. The distance between the images formed by the bundles of rays passing through the upper and lower halves of the lens is 0.8F·C/B on the plane 4, and 0.8F·D/B on the plane 5.

The image movement in the focus detecting principle of the invention is as described above. In FIGS. 1 and 2, the dotted lines indicate the light quantity centers of the upper and lower bundles of rays. Two bundles of rays passing through the upper half and the lower half of the lens converge at one point on the focussing plane only, but are not at the same position in the case of defocussing. That is, the sections of the bundles of rays at a plane are located at different positions. This is the principle of the invention. In the device according to the invention, the two bundles of rays are received by light receiving elements, so that proper focus is detected by determining whether or not the outputs of the light receiving elements are equal.

FIG. 4 is a schematic diagram showing a single-lens reflex camera to which the device according to the invention is applied. Light from an object 2 passes through a photographing lens. A part of the light is reflected upwardly by a mirror 13 whose central portion in the vicinity of the optical axis 6 is a half mirror. Therefore, the image of the object can be observed by the eye 18 through a focussing screen 14, a condenser lens 15, a penta-prism 16 and a magnifier 17. The other portion of the light passes through the half mirror and is directed by a total reflection mirror 12 downwardly and is further introduced to light receiving element arrays 9a and 9b by concave mirrors 8a and 8b.

FIG. 5 is an explanatory diagram showing the concave mirrors. More specifically, FIG. 5(a) is a side view of an ordinary concave mirror, FIG. 5(b) is a side view of the concave mirrors employed in this invention, and FIG. 5(c) is a front view of the concave mirrors shown in FIG. 5(b). As is clear from FIG. 5(c), the concave mirror is divided by a center line 28 into two parts, namely, the two concave mirrors 8a and 8b.

FIG. 6 is an enlarged view showing the light receiving elements and other relevant components. In FIG. 6, reference numeral 19 designates a plane at a position equivalent to the position of the film. A spatial image is formed on the plane 19 at the time of focussing. Reference numeral 11 designates a light shielding board for determining the observation range of the focus detecting device. Hereinafter the opening of the board 11 will be referred to as "window". In this example, the window is flush with the aforementioned plane 19. A bundle of rays passing through the window is applied to the light receiving element arrays 9a and 9b by means of the concave mirrors 8a and 8b.

Referring to the theoretical diagrams of FIGS. 1 and 2, if it is assumed that a bundle of rays is reflected by the concave mirror 8a to form an image is equivalent to the upper half portion (shadowed) in FIGS. 1 or 2, and a bundle of rays reflected by the concave mirror 8b to form an image is equivalent to the lower half portion in FIGS. 1 or 2, then it can be considered that the image forming surface, or the plane 3, divided into two parts, becomes the surfaces of the light receiving element arrays 9a and 9b. It is apparent from this that the focus detecting principle can be established. The directions of movement of the images on the light receiving element arrays 9a and 9b are perpendicular to the surface of FIG. 6.

FIG. 7 is a diagram as viewed from the right side of FIG. 6. The portion shadowed in FIG. 7 is a bundle of rays which arrives from the object on the optical axis 6 and is then reflected by the concave mirror 8a. FIG. 7 shows the state of the optical system at the time of front defocussing, which corresponds to the state shown in FIG. 1. In FIG. 7, the incident light to the concave mirrors, and the light receiving element array 9a are not shown. This is done to show FIG. 7 clearly, by avoiding overlapping of various elements. As shown in FIG. 7, the light receiving element array 9b is made up of four light receiving elements 9b-1, 9b-2, 9b-3 and 9b-4. Similarly, the light receiving element array 9a is made up of four light receiving elements 9a-1, 9a-2, 9a-3 and 9a-4. The light receiving elements 9a-1 and 9b-1 are so arranged that they are placed at different positions, but observe the same image at the time of focussing. This is also true for the remaining light receiving elements 9a-2 and 9b-2, 9a-3 and 9b-3, and 9a-4 and 9b-4. Hereinafter, these combinations will be referred to as "pairs of light receiving elements", respectively. The purpose of dividing an image into two parts by the two concave mirrors is to give equal images to the two light receiving element arrays at the time of focussing and to practice the above-described focus detecting method.

Since the optical system is constructed as described above, the images on the light receiving element arrays are as shown in FIG. 8. It should be noted that the light receiving element arrays are disposed in the image forming planes, equivalent to the film surface 10, obtained at the time of focussing. For simplification in description, only the image formed by a bundle of rays from the object on the optical axis will be illustrated. However, it can be readily appreciated from the description made with reference to FIG. 2 that similar variations occur with bundles of rays from the other portions of the objects.

FIG. 8(a) shows the images on the light receiving element arrays 9a and 9b in the case of front defocussing. FIG. 8(b) shows the images on the light receiving element arrays 9a and 9b at the time of focussing, the images being at optically equal positions. FIG. 8(c) shows the images on the light receiving element arrays 9a and 9b in the case of rear defocussing.

Referring back to FIGS. 6 and 7, the intersection of the optical axis 6 and the film equivalent plane 19 is indicated at 30, the intersection of the optical axis 6 and the concave mirrors 8a and 8b is indicated at 32, and the intersections of two optical axes 6' branched from the optical axis 6 and the surfaces of the light receiving element arrays are indicated at 31a and 31b, respectively. If the concave mirror 8a is formed as an ellipsoidal mirror with the plants 30 and 31a as its focal points, and the concave mirror 8b is similarly formed as an ellipsoidal mirror with the points 30 and 31b as its focal points, then aberration on the optical axis is reduced to a minimum. However, the mirrors may also be simple spherical mirrors in the case where the point 30 is very close to the point 31a, and to the point 31b, and both the light receiving element arrays and the window are small.

It is assumed that when the light receiving element arrays 9a and 9b are in the plane indicated by the dotted line 3 in FIG. 7, proper focus is obtained. When the light receiving element arrays 9a and 9b are in the planes indicated by the dotted lines 4 and 5, rear focussing and the front focussing are obtained, respectively. Then the technical concept of the present invention can be readily understood. In this example, the positions of the light receiving element arrays 9a and 9b and of the film surface 10 are not changed in the direction of the optical axis according to whether proper focus is obtained or not. Instead the position of the image is changed in the direction of the optical axis. However, the essential aspect is that the positions of the images on the light receiving element arrays are changed according to the state of focussing.

When the focussing is obtained, the positions of the images projected onto the light receiving element arrays coincide with each other. Therefore, the sum of the absolute values of the differences between the outputs of the pairs of light receiving elements in zero. If the outputs of the light receiving elements 9a-1, 9a-2, 9a-3, 9a-4, 9b-1, 9b-2, 9b-3 and 9b-4 are represented by 9a-1, 9a-2, 9a-3, 9a-4, 9b-1, 9b-2, 9b-3 and 9b-4, respectively, then $$\sum_{i=1}^{4} |9a\text{-}i - 9b\text{-}i| = 0.$$

When proper focus is not obtained, the images on the light receiving elements are shifted in the opposite directions. Therefore, in the case where the images of the object projected on the light receiving elements have contrast in the directions of arrangement of the light receiving elements in the light receiving element arrays, the above-described sum of the absolute values of the differences between the outputs of the pairs of light receiving elements is not zero.

FIG. 10 shows one example of a signal processing circuit which is provided according to this invention. The differences between the outputs of the pairs of light receiving elements $9a$-1 and $9b$-1, $9a$-2 and $9b$-2, $9a$-3 and $9b$-3, and $9a$-4 and $9b$-4 are obtained in four stage differential circuit 20, respectively. The absolute values of the outputs of the differential circuits 20 are obtained in absolute value circuits 21, respectively. The outputs of the absolute value circuits 21 are applied to an addition circuit 22 adapted to subject the outputs of the absolute value circuits to addition, whereby the output $$\sum_{i=1}^{4} | 9a\text{-}i - 9b\text{-}i |$$

is provided and is employed as the focus detection outputs. A circuit 23 operates to convert an amount of extension of the lens into an electrical value. This output, or the electrical value, will be considered in association with the aforementioned focus detection outputs.

FIG. 11 is a graphical representation with the outputs corresponding to the amounts of extension of the lens plotted on the horizontal axis and with the focus detection outputs of the addition circuit 22 plotted on the vertical axis. The focus detection outputs of the device according to the above-described focus detection principle should be zero at the time of focussing. However, in practice, it takes the minimum value as shown in FIG. 11 because of noise in the circuit. In FIG. 11, reference numeral 26 designates the focus detection outputs curve, and reference numeral 27 designates a point at which the proper focus is obtained.

Figure 12:
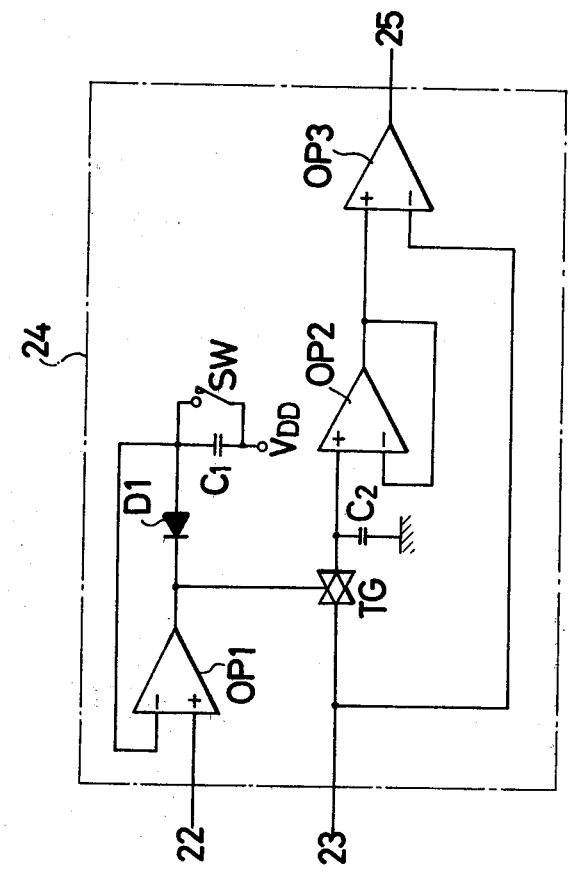
FIG. 12 is one example of a circuit for detecting the minimum value of the focus detection output shown in FIG. 11.

Referring back to FIG. 10, reference numeral 24 designates a circuit for detecting the minimum value of the focus detection outputs. If the circuit 24 is designed so that when the focus detection output has the minimum value, the amount of extension of the lens can be detected, then the position of focus can be detected by scanning the lens only once. Reference numeral 25 designates a display circuit. Shown in FIG. 12 is one example of the minimum value detection circuit 24, where the output of the addition circuit 22 is applied to the non-inverted terminal (+) of an operational amplifier $OP_1$. When the output of the addition circuit 22 has the minimum value, the output of the OP amplifier $OP_1$ is inverted from negative level to positive level due to the operations of a capacitor $C_1$, a diode $D_1$ and the OP amplifier $OP_1$. A switch SW is designed to open in response to the start of focus detection operation. Reference character TG designates a semi-conductor switch which operates to be in conductive state when the output of the OP amplifier $OP_1$ is of negative level, and to be in non-conductive state when it is of positive level. A capacitor $C_2$ operates to store the output of the circuit 23 when the semi-conductor switch TG is in the non-conductive state. An operational amplifier $OP_2$ is a buffer amplifier to the stored output of the circuit 23. An operational amplifier $OP_3$ is a well known coincidence circuit where the output of the circuit 23 is compared with the stored content of the capacitor 23, and a signal representative of the fact whether the both signals are coincident each other or not is outputted to the display circuit 25. The display circuit 25 is designed so that, when proper focus is obtained, it is indicated by a light emission diode or a lamp which is provided to permit the user to readily see it. If the output signal of the display circuit is employed to drive a servo mechanism thereby to control the amount of extension of the lens, then the camera may be converted into an automatic focussing camera.

The arrangement and function of this invention are as described above, and the invention has the following merits: Since the components of the device according to the invention are only the concave mirrors, the light receiving elements and the electronic circuit, the device can be manufactured small in size and light in weight. In addition, since the power consuming sections are small, the device can be operated with a small power consumption. The focus detecting operation is highly accurate and the detection sensitivity is also high. This is mainly because the movement of image is utilized for detecting the focussing. However, another reason for this is that silicon photo-diodes, chemical semiconductors, CCD's or self-scanning type image sensors can be used as the light receiving elements.

Furthermore, the optical path is divided by the concave mirrors, and therefore the construction is simple, and the loss in light quantity is significantly reduced, which leads to the high detection sensitivity. The device according to the invention can also be applied to optical equipment such as enlargers, slide projectors and movie projectors as well as cameras.

It is apparent that modifications are possible without departing from the essential scope of this invention.

What is claimed is:

1. A focus detecting device for a single lens reflex camera having a movable mirror comprising: a pair of concave mirrors formed as divided components from a unitary concave mirror surface, said concave mirrors reforming a primary image of an object which is formed between a lens and the focal plane of said lens; deflection means on said mirror for directing said primary image onto said concave mirrors; said concave mirrors dividing the primary image into two secondary images; a pair of light receiving element arrays provided in the image forming planes of said secondary images and receiving said secondary images from said concave mirrors; means to shield said light receiving element arrays from the focal plane of said lens, signal processing circuit means for subjecting the outputs of said light receiving element arrays to comparison and producing an output signal indicating whether or not said lens is focussed on said object, said signal processing circuit means comprising differential circuit means responsive to the outputs of a corresponding pair of elements in said pair of light receiving element arrays, absolute value circuit means for converting the output of said differential circuit means into an absolute value signal, transducer means to convert the extension of said lens into an electrical signal and detector means receiving said electrical signal and said absolute value signal and producing said output signal, wherein said two secondary images are shifted in the opposite direction on said light receiving element arrays if the image is defocussed so that the difference between the outputs of said two light receiving element arrays is not zero, and when the image is focussed said two secondary images are located at equivalent positions on said light receiving element arrays so that the difference between the outputs of said two light receiving element arrays is zero, and display means receiving the output signal from said signal processing circuit means for indicating the state of focus.

2. A focus detecting device of claim 1 wherein said concave mirrors are ellipsoidal mirrors.

3. A focus detecting device of claim 1 wherein said concave mirrors are spherical mirrors.

4. The device of claim 1 wherein said detector means produces said output signal as a function of minimum absolute value with respect to lens extension.

5. The device of claim 1 wherein said light receiving arrays respectively comprise a series of N light sensitive elements.

6. The device of claim 5 wherein said differential circuit means comprises a series of N differential circuits said absolute value circuit means comprises N absolute value detectors coupled respectively to said differential circuit and further comprising an addition circuit for adding the outputs of said absolute value detectors and supplying said absolute value signal to said detector means.

7. The device of claim 5 wherein said light sensitive elements are silicon photo-diodes.

8. The device of claim 5 wherein said light sensitive elements are chemical semiconductors.

9. The device of claim 5 wherein said light sensitive elements are charge coupled devices.

10. The device of claim 5 wherein said light sensitive elements are self-scanning type image sensors.

11. The device of claims 1, 2, or 3 wherein said lens comprises of photography lens on a camera.

12. The device of claim 11 further comprising a mirror means receiving the primary image and deflecting said image to said concave mirrors which allows viewing of said image in a view finder of said camera.

13. The device of claim 12 further comprising an aperture positioned between said mirror means and said concave mirrors.

* * * * *